(12) United States Patent
Christensen et al.

(10) Patent No.: US 12,122,139 B2
(45) Date of Patent: \*Oct. 22, 2024

(54) METHOD FOR PROVIDING AN EXTREME CHEMICAL RESISTANT FILM, A FILM AND LAMINATE OBTAINABLE THEREFROM

(71) Applicant: adapa flexibles Denmark Slagelse A/S, Slagelse (DK)

(72) Inventors: Lars Christensen, Slagelse (DK); Peter Johansen, Odense C (DK); Torben Fogtmann, Nyborg (DK)

(73) Assignee: adapa flexibles Denmark Slagelse A/S, Slagelse (DK)

( * ) Notice: Subject to any disclaimer, the term of this patent is extended or adjusted under 35 U.S.C. 154(b) by 10 days.

This patent is subject to a terminal disclaimer.

(21) Appl. No.: 17/675,647

(22) Filed: Feb. 18, 2022

(65) Prior Publication Data

US 2022/0168998 A1 Jun. 2, 2022

Related U.S. Application Data

(60) Division of application No. 16/835,018, filed on Mar. 30, 2020, now Pat. No. 11,260,624, which is a
(Continued)

(30) Foreign Application Priority Data

Dec. 29, 2015 (EP) ..................... 15202962

(51) Int. Cl.
*B32B 7/12* (2006.01)
*B05D 1/26* (2006.01)
(Continued)

(52) U.S. Cl.
CPC .............. *B32B 7/12* (2013.01); *B05D 1/265* (2013.01); *B32B 15/082* (2013.01);
(Continued)

(58) Field of Classification Search
None
See application file for complete search history.

(56) References Cited

U.S. PATENT DOCUMENTS 5,613,958 A 3/1997 Kochinke et al.
6,120,860 A 9/2000 Bowen et al.
(Continued)

FOREIGN PATENT DOCUMENTS

BR 102015012729 A2 1/2017
DE 202008017320 U1 5/2009
(Continued)

OTHER PUBLICATIONS

DuPont Selar® PA3426 Blends With Nylon 6; downloaded from internet on Sep. 10, 2005; http://www.dupont.com/packaging/products/selar/pdsprint/a3426; 11 pgs.
(Continued)

*Primary Examiner* — Frances Tischler
(74) *Attorney, Agent, or Firm* — Holland & Hart LLP

(57) ABSTRACT

The present disclosure relates to a method for providing a film. The method may include providing a base layer, wherein the base layer is resistant to one or more of water or oxygen; coextruding a tie layer and a contact layer to provide a coextrusion layer; coating the coextrusion layer to the base layer; allowing the coextrusion layer coated to the base layer to adhere to form the film, wherein the film comprises the tie layer and the contact layer formed as a coextrusion layer coated to the base layer; wherein the tie layer comprises one or more layers, and wherein the tie layer, or the one or more layers of the tie layer, has a loading in the range of 7 to 20 g/m²; wherein the contact layer comprises a cycloolefin copolymer (COC).

27 Claims, 3 Drawing Sheets

Related U.S. Application Data continuation of application No. 15/780,999, filed as application No. PCT/EP2016/082876 on Dec. 29, 2016, now Pat. No. 11,376,814.

(51) Int. Cl.

| | |
|---|---|
| *B32B 15/082* | (2006.01) |
| *B32B 15/085* | (2006.01) |
| *B32B 15/20* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 37/15* | (2006.01) |

(52) U.S. Cl.
CPC ............ *B32B 15/085* (2013.01); *B32B 15/20* (2013.01); *B32B 27/08* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 37/153* (2013.01); *B32B 2250/05* (2013.01); *B32B 2255/20* (2013.01); *B32B 2307/31* (2013.01); *B32B 2307/714* (2013.01); *B32B 2307/7244* (2013.01); *B32B 2307/7265* (2013.01); *B32B 2323/00* (2013.01); *B32B 2398/20* (2013.01); *B32B 2439/00* (2013.01); *B32B 2439/80* (2013.01); *B32B 2553/00* (2013.01)

(56) References Cited

U.S. PATENT DOCUMENTS

| | | | |
|---|---|---|---|
| 6,670,423 | B2 | 12/2003 | Hausmann |
| 6,891,018 | B2 | 5/2005 | Murakami et al. |
| 6,903,161 | B2 | 6/2005 | Morris |
| 6,921,563 | B2 | 7/2005 | Goerlitz et al. |
| 8,003,179 | B2 | 8/2011 | Merical et al. |
| 8,703,283 | B2 | 4/2014 | Goerlitz et al. |
| 8,722,164 | B2 | 5/2014 | Bekele et al. |
| 9,487,918 | B2 | 8/2016 | Geerdinck et al. |
| 9,452,593 | B2 | 9/2016 | Tatarka et al. |
| 9,663,281 | B2 | 5/2017 | Hall et al. |
| 10,889,093 | B2 | 1/2021 | Wang |
| 11,504,954 | B2 | 11/2022 | Herb et al. |
| 2003/0066778 | A1 | 4/2003 | Colombo |
| 2004/0234790 | A1 | 11/2004 | Smith et al. |
| 2005/0037162 | A1 | 2/2005 | Adams |
| 2005/0112337 | A1 | 5/2005 | Jester |
| 2006/0198973 | A1 | 9/2006 | Jester |
| 2008/0286512 | A1 | 11/2008 | Holzmuller et al. |
| 2009/0208685 | A1 | 8/2009 | Rivers et al. |
| 2011/0158564 | A1 | 6/2011 | Krumme |
| 2015/0225151 | A1 | 8/2015 | Osborn et al. |
| 2017/0158400 | A1 | 6/2017 | Priscal et al. |
| 2017/0348246 | A1 | 12/2017 | Tohara et al. |
| 2018/0354702 | A1 | 12/2018 | Liu et al. |

FOREIGN PATENT DOCUMENTS

| | | |
|---|---|---|
| DE | 102012113026 A1 | 6/2014 |
| DE | 102013113718 A1 | 6/2015 |
| EP | 0245921 A2 | 11/1987 |
| EP | 1364777 B1 | 8/2005 |
| EP | 2 939 667 A1 | 11/2005 |
| EP | 1769908 A1 | 4/2007 |
| EP | 1525092 B1 | 5/2007 |
| EP | 1775122 B1 | 9/2014 |
| EP | 3000750 A1 | 3/2016 |
| EP | 1475228 B1 | 7/2017 |
| EP | 2907769 B1 | 9/2017 |
| EP | 2349867 B1 | 10/2017 |
| EP | 3144127 B1 | 1/2018 |
| EP | 3112384 B1 | 7/2018 |
| EP | 3360530 A1 | 8/2018 |
| EP | 2986450 B1 | 1/2019 |
| EP | 3210907 B1 | 7/2019 |
| WO | WO 91/09731 A1 | 7/1991 |
| WO | WO 1995007816 A1 | 3/1995 |
| WO | WO 00/44559 A1 | 8/2000 |
| WO | WO 2001064786 A1 | 9/2001 |
| WO | WO 2005/037539 A1 | 4/2005 |
| WO | WO 2005097486 A1 | 10/2005 |
| WO | WO 2009/105205 A1 | 8/2009 |
| WO | WO 2010047906 A1 | 4/2010 |
| WO | WO 2010075946 A1 | 7/2010 |
| WO | WO 2012/037180 A1 | 3/2012 |
| WO | WO 2013/004243 A1 | 1/2013 |
| WO | WO 2013028398 A1 | 2/2013 |
| WO | WO 2013034273 A1 | 3/2013 |
| WO | WO 2013116445 A1 | 8/2013 |
| WO | WO 2014023995 A1 | 2/2014 |
| WO | WO 2015097208 A1 | 7/2015 |
| WO | WO 2015118215 A1 | 8/2015 |
| WO | WO 2015123211 A1 | 8/2015 |
| WO | WO 2015/174502 A1 | 11/2015 |
| WO | WO 2015187173 A1 | 12/2015 |
| WO | WO 2015187174 A1 | 12/2015 |
| WO | WO 2015199637 A1 | 12/2015 |
| WO | WO 2016076844 A1 | 5/2016 |
| WO | WO 2016164794 A1 | 10/2016 |
| WO | WO 2016190081 A1 | 12/2016 |
| WO | WO 2016194555 A1 | 12/2016 |
| WO | WO 2016200363 A1 | 12/2016 |
| WO | WO 2017034560 A1 | 3/2017 |
| WO | WO 2017063087 A1 | 4/2017 |
| WO | WO 2017087032 A1 | 5/2017 |
| WO | WO 2017100182 A1 | 6/2017 |
| WO | WO 2017100358 A1 | 6/2017 |
| WO | WO 20121192271 A1 | 9/2021 |

OTHER PUBLICATIONS

DuPont Selar® PA3426 Product Data Sheet; Version 44.0; Last modified on Mar. 29, 2017; 2 pgs.

DuPont Selar® PA3426 Product Data Sheet (updated 2010); Jan. 7, 2010; Copyright E.I. du Pont de Nemours and Company, Inc.; 3 pgs.

Encyclopedia of Polymer Science and Engineering, vol. 4, John Wiley & Sons; vol. 4; Composites, Fabrication to Die Design; 4 pgs.

Wypych, "Handbook of Polymers", ChemTech Publishing, Toronto, Ontario Canada, 2012, 31 pages.

Database WPI Week 201579, Derwent Publications Ltd., London, GB; AN 2015-71769A, XP002759263; 2 pgs.

Petitioner's Sur-Reply in Opposition of Patent Owner's Revised Motion to Amend, PTAB, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 19 pages, Apr. 8, 2024.

Petitioner's Opposition to Patent Owner's Revised Motion to Amend, PTAB, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 32 pages, Mar. 5, 2024.

Declaration of Richard J. Spontak, PhD., In Support of Petitioner's Opposition to Patent Owner's Revised Motion to Amend, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 60 pages, Mar. 5, 2021.

Remote Deposition of Stephen McCarthy, Ph.D, Taken on behalf of Petitioner vol. 2, Feb. 28, 2024, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 55 pages, Feb. 28, 2024.

(56) References Cited

OTHER PUBLICATIONS

Patent Owners' Reply to Petitioners Opposition to Patent Owner's Revised Motion to Amend, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 18 pages, Mar. 26, 2024.
Deposition of Richard J. Spontak, Ph.D, vol. 2, Mar. 15, 2024, Via Remote Depo, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 84 pages.
Third Declaration of Stephen McCarthy, Ph.D., In Support of Patent Owner's Reply to the Petitioner's Opposition to Patent Owner's Revised Motion to Amend, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 58 pages, Mar. 25, 2004.
Patent Owner's Demonstratives, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 80 pages, Apr. 10, 2024.
Petitioner's Demonstratives, Apr. 12, 2024, *Huhtamaki Flexible Packaging Germany GmbH & Co. KG*, Petitioner vs. *Adapa Flexibles Denmark Slagelse A/S f/k/a Danapak Flexibles A/S*, Patent Owner, Case No. PGR2023-00008, U.S. Pat. No. 11,260,624 B2, 106 pages.
Petition for Post-Grant Review of U.S. Pat. No. 11,260,624 B2 dated Dec. 1, 2022; *Huhtamaki Flexible Packaging Germany GmbH & Co. KG*, Petitioner vs *Danapak Flexibles A/S*, Patent Owner, Case No. PGR2023-00008, 96 pages.
Prosecution history for U.S. Appl. No. 16/835,018, filed Mar. 20, 2020.
Expert Declaration of Richard J. Spontak, Ph.D, In support of Huhtamaki Flexible Packaging Germany GmbH & Co. KG's Petition for Post-Grant Review of U.S. Pat. No. 11,260,624, dated Nov. 30, 2022, 127 pages.
Prosecution history for U.S. Appl. No. 15/780,999, filed Jun. 1, 2018.
Curriculum Vitae of Richard J. Spontak, Ph. D. 48 pages, Dec. 1, 2022.
Dow Packaging & Specialty Plastics Product Data Sheet, NUCREL 3990 Acid Copolymer, 7 pages.
Dow, LDPE 4012 Low Density 8,003,179 B2 Resin Technical Information, 6 pages, Aug. 4, 2011.
Plastics News, Topas and MSM make progress on Barex replacements dated Nov. 29, 2022, Source url: https://www.plasticsnews.com/article/20151119/NEWS/151119853/topas-and-msm-make-progress-on-barex-replacements.
Topas Advanced Polymers, Polyplastics DAICEL Group, Topas COC is Commercial Alternative to Barex; Packaging Companies Adopt COC for Broad Range of Applications Including Pharamceuticals, dated Nov. 18, 2015, 3 pages.
Declaration of Julie Glascock dated Nov. 21, 2022 and includes Printout of CKM database entry and Printout of WorldCat database entry, 9 pages.
TOPAS Advanced Polymers, Cyclic Olefin Copolymer (COC), Published Mar. 2006, 20 pages.
Declaration of Samuel A. Raque dated Nov. 30, 2022, *Huhtamaki Flexible Packaging Germany GmbH & Co. KG*, Petitioner vs. *Danapak Flexibles A/S*, Patent Owner, Case No. PGR2023-00008, 6 pages.
TOPAS Advanced Polymers, COC 8007F-400 Safety Data Sheet version 6, (2015); 14 pages.
TOPAS Advanced Polymers, COC 8007F-400 Safety Data Sheet, version 7.02 dated Apr. 2, 2018, 9 pages.

Patent Owner's Preliminary Response dated Mar. 28, 2023, *Huhtamaki Flexible Packaging Germany GmbH & Co. KG*, Petitioner vs. *Danapak Flexibles A/S*, PGR2023-00008, U.S. Pat. No. 11,260,624; 68 pages.
Prosecution history for U.S. Appl. No. 16/425,067, filed May 10, 2022.
Redline Comparison between Riis and Osborn, Mar. 28, 2023.
Response to Non-Final Office Action for U.S. Appl. No. 16/516,792, dated Mar. 11, 2021, 12 pages.
Response to Final Office Action for U.S. Appl. No. 16/516,792, dated Aug. 3, 2022, 19 pages.
Patent Owner's Response dated Sep. 12, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264, dated Sep. 12, 2023, 84 pages.
Certified Copy of Priority Document for EP15202962.5., 31 pages, Dec. 29, 2015.
Curriculum Vitae for Dr. Stephen P. McCarthy, 17 pages, Sep. 12, 2023.
Declaration of Stephen P. McCarthy dated Sep. 11, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264, 106 pages.
Deposition Transcript of Richard J. Spontak, Ph.D. dated Aug. 31, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264, 208 pages.
Petitioner's Reply to Patent Owner's Response dated Dec. 5, 2023; *Huhtamaki Flexible Packaging Germany GmbH & Co. KG*, Petitioner, vs. *Danapak Flexibles A/S*, Patent Owner, PGR2023-0008, U.S. Pat. No. 11,260,264, 25 pages.
Morris, "The Science and Technology of Flexible Packaging, Multilayer Films from Resin and Process to End Use", published by Elsevier, Inc., 2017, 709 pages.
Second Declaration of Richard J. Spontak, Ph.D., dated Dec. 5, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264; 82 pages.
Decision Granting Institution of Post-Grant Review 35 U.S.C.§ 324, dated Jun. 20, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264, 39 pages.
Patent Owner's Motion to Amend dated Sep. 12, 2023, *Huhtamaki Flexible Packaging Germany GmbH & Co. KG*, Petitioner, vs. *Danapak Flexibles A/S*, Patent Owner, PGR2023-0008, U.S. Pat. No. 11,260,264, 37 pages.
Preliminary Guidance Patent Owner's Motion to Amend, entered Dec. 29, 2023; *Huhtamaki Flexible Packaging Germany GmbH & Co. KG*, Petitioner, vs. *Danapak Flexibles A/S*, Patent Owner, PGR2023-0008, U.S. Pat. No. 11,260,264, 21 pages.
Patent Owner's Sur-Reply to Petitioner's Reply to Patent Owner's Response dated Jan. 16, 2024; *Huhtamaki Flexible Packaging Germany GmbH & Co. KG*, Petitioner, vs. *Danapak Flexibles A/S*, Patent Owner, PGR2023-0008, U.S. Pat. No. 11,260,264, 31 pages.
Patent Owner's Revised Motion to Amend dated Jan. 16, 2024; *Huhtamaki Flexible Packaging Germany GmbH & Co. KG*, Petitioner, vs. *Danapak Flexibles A/S*, Patent Owner, PGR2023-0008, U.S. Pat. No. 11,260,264; 45 pages.
Declaration of Stephen McCarthy, PhD., In support of Petition for Post-Grant Review of U.S. Pat. No. 10,889,093; In the USPTO before the Patent /Trial and Appeal Board, *EPL Limited*, Petitioner vs. *Colgate-Palmolive Company*, Patent Owner; Case PGR2022-00001.
Oral Deposition of Stephen McCarthy, PhD. dated Nov. 20, 2023, USPTO before the PTAB Case No. PGR2023-0008, *Huhtamaki Flexible Packaging Germany GmbH & Co. KG*, Petitioner vs. *Adapa Flexibles Denmark Slagelse A/S*. 249 pages.
Judgement and Order—PGR2023-0008, U.S. Pat. No. 11,260,624 B2 in the United States Patent & Trademark Office, Before the Patent Trial and Appeal Board, *Huhtamaki Flexible Packaging Germany GmbH & Co. KG*, Petitioner v. *Adapa Flexibles Slagelse A/S f/k/a/ Danapak Flexibles A/S*, Patent Owner, dated Jun. 18, 2024, 78 pages.

**Transfer to packaging material
API: Rivastigmine**

Fig. 4

METHOD FOR PROVIDING AN EXTREME CHEMICAL RESISTANT FILM, A FILM AND LAMINATE OBTAINABLE THEREFROM

CROSS-REFERENCE TO RELATED APPLICATIONS

This application is a divisional of U.S. patent application Ser. No. 16/835,018, entitled "A METHOD FOR PROVIDING AN EXTREME CHEMICAL RESISTANT FILM, A FILM AND LAMINATE OBTAINABLE THEREFROM," filed Mar. 30, 2020, which is a continuation of U.S. patent application Ser. No. 15/780,999, entitled "A METHOD FOR PROVIDING AN EXTREME CHEMICAL RESISTANT FILM, A FILM AND LAMINATE OBTAINABLE THEREFROM," filed Jun. 1, 2018, which is the national phase entry of International Application No. PCT/EP2016/082876, entitled "A METHOD FOR PROVIDING A CHEMICAL RESISTANT FILM", filed Dec. 29, 2016, which claims the benefit of European Patent Application No. 15202962.5, entitled "A METHOD FOR PROVIDING A CHEMICAL RESISTANT FILM", filed Dec. 29, 2015, each of which is assigned to the assignee hereof, and each of which is expressly incorporated by reference in its entirety herein.

BACKGROUND

The present disclosure relates to a method for providing an extreme chemical resistant film whereby a tie layer and a contact layer are coextruded with a base layer, such as a metal foil, as well as films and laminates obtained by the method and uses of the films and laminates to wrap aggressive chemical substances such as nicotine, fentanyl, lidocaine and rivastigmine.

In the pharmaceutical industry substances, including highly aggressive substances such as nicotine, fentanyl, rivastigmine and lidocaine, are packed as tablets in inhalers, patches etc. resulting in special requirements for the packing, laminate, or film for sealing these substances in order to ensure that no adverse degradation takes place.

One common example is the problem relating to the packaging of nicotine, in particular as nicotine patches, because nicotine is highly aggressive towards its environment and highly volatile. These properties are problematic for the consumer safety and product durability if not addressed, because it is important that the amount of nicotine in, for example a tablet, gum or a patch is stable and complies with the product specification. Further, it is important to avoid adverse reactions between the packaging and the pharmaceutical substance. Additionally, from a business perspective a long stable shelf time is highly desirable. Thus, the chemical requirements of a packaging, film or laminate are typically:

- Resistance towards highly aggressive substances such as nicotine.
- Inert properties for ensuring that chemical compounds do not migrate from the exterior environment of for example a laminate, through the laminate getting into contact with a sealed substance;
- Possibly ensuring that the packaging is child proof to increase safety of potentially hazardous compounds.

A known polymer that fulfils the requirements of extreme chemical resistance and inert properties is a polyactyllonitrile (PAN) based film, which is sold for example as resins under the trademark Barex®, which is manufactured for example by the company Ineos. Barex® is widely used and approved for drugs and food applications and is used because it is a good barrier towards oxygen, nitrogen and carbon dioxide compared to other common polymers, and because it has excellent chemical resistance towards different functional groups such as hydrocarbons, ketones, esters, alcohols, bases and acids and/or pharmaceuticals such as nicotine. Furthermore, extruded Barex® resin is heat stable and therefore weldable at a temperature around 160-220° C., which makes it possible to use in flexible packagings. However, Barex® is sold at a high prize due to the difficulties in the production and subsequent extrusion to film resulting in a high loss of material. Furthermore, the water and oxygen resistance of Barex® is not satisfactory for all purposes.

Another solution can be found in WO 00/44559 disclosing a material for packaging nicotine containing products (e.g. patches, tablets, lozenges, nasal spray), wherein the material comprises a polymer based on dimethyl-2,6-naphthalene dicarboxynate and/or 2,6-naphthalene dicarboxylic acid monomers. Further, it is disclosed that a polymeric film is combined with other barrier materials in a laminate to further improve the barrier characteristic of the laminate. The preferred material for a laminate is aluminium due to its good oxygen and water barrier properties.

In addition to the barrier properties, in particular for pharmaceuticals, it is important that the concentration of the substances is stable and reliable, which also poses requirements of the packaging and laminates in terms of inertness and permeability.

Hence, given the increased market and demands for packagings, there is an instant need for finding solutions for packaging, of in particular highly aggressive substances and pharmaceuticals, which fulfil all the requirements while still being economical.

SUMMARY OF THE INVENTION

With this background it is an object of the present disclosure to provide solutions that meet one or more of the needs described above, that is, foe example provide impermeability and inertness to a packaging. Furthermore, it is an object to provide a laminate that is weldable at temperatures suitable for the manufacture of flexible wrappings, such as for use in preparing packagings for patches. It is a further object to provide methods and products that are cost efficient without compromising the quality of the products.

Accordingly, in a first aspect this is solved by a method for providing, e.g. an aggressive chemical resistant, film, said method comprising the steps of:
  i) providing a base layer, which is water and/or oxygen resistant;
  ii) coextruding a layer comprising a tie layer and a contact layer to provide a coextrusion layer;
  iii) coating the coextrusion layer to the base layer;
  iv) allowing the coextrusion layer coated to the base layer to adhere to the base layer to provide the, e.g. aggressive chemical resistant, film comprising the tie layer and the contact layer formed as a coextrusion layer coated to the base layer, wherein the tie layer comprises at least one layer and wherein the contact layer comprises a polymer having a RED value based on Hansens Solubility parameter (HSP) towards an aggressive chemical of >0.8, more preferred a RED value in the range of 0.8 to 10, even more preferred 0.8 to 5, and most preferred between 1 to 2.

It has surprisingly been found that when coextruding the tie layer and the contact layer according to the disclosure, the respective layers can be thinner while maintaining the overall mechanical and chemical robustness of the final film and laminates and wrappings made with the film. The co-extrusion also results in a better adherence of the various layers resulting in a homogenous film in which the layers do not separate.

While it was previously believed that usable polymers should be hydrophobic (in order to repel water from the surroundings), the present inventors have found that by providing the film according to the disclosure where the coextrusion layer comprises a tie layer and a contact layer, and where the contact layer comprises a polymer having a relative energy difference (RED) value in the range 0.8 to 10 relative to the aggressive substance, it has surprisingly turned out that the desired effect of the laminate being inert to aggressive compounds, such as nicotine, rivastigmine and lidocaine, while still providing a barrier to external factors such as water/moist and oxygen, is obtained.

A polymer candidate for use as a contact layer in the present disclosure is selected by calculating the RED value, which is generally used to predict the solubility of a polymer in a particular solvent, or the compatibility of two polymers in a blend. In the present disclosure the RED values for various polymer/solvent systems have been calculated, wherein the polymer is the polymer forming the contact layer, and the solvent is an aggressive chemical substance such as nicotine, rivastigmine, fentanyl and lidocaine etc.

The RED value for the polymer and the aggressive chemical substance is calculated by using the theory of the Hansen solubility Parameters (HSP), which is described in C. M. Hansen: "Hansen Solubility Parameters, A User's Handbook", CRC Press, Boca Raton, 1999.

The HSP system between the polymer and the aggressive chemical substance is described by parameters set up in a 3 dimensional coordinate system:

$\delta_D$ for dispersion cohesion energy
$\delta_P$ for dipolar cohesion energy
$\delta_H$ for hydrogen bonding cohesion energy.

The HSP distance, Ra, between polymer and the aggressive chemical substance is given by:

$$Ra^2 = 4(\Delta\delta_D)^2 + \Delta\delta_P^2 + \Delta\delta_H^2.$$

The $\Delta$ indicates the difference in the given parameter for the aggressive substance and the polymer.

The relation between the HSP distance, Ra and RED is given as:

$$RED = Ra/Ro$$

where Ro is the interaction radius, which determines the radius of the sphere in Hansen space, and the center are the three Hansen parameters. All values are calculated or determined with empiric data and it is known to the person skilled in the art how to calculate the values.

The obtained RED value indicates whether or not the polymer is likely to dissolve in the aggressive chemical substance or not:
RED<1 the polymer and the aggressive chemical substance will dissolve
RED=1 the polymer and the aggressive chemical substance will partially dissolve
RED>1 the polymer and the aggressive chemical substance will not dissolve The resulting RED value is used to give an indication of the likelihood of dissolution or not.

All values can be calculated using the Hansen Solubility Parameter in Practice by (HSPiP) Software, commercially available at http://hansen-solubility.com.

Contact layer polymers according to the disclosure surprisingly turned out to have a RED value in the range from 0.8 and higher, preferably, 0.8 to 10 and more preferred 0.8 to 5 and most preferred 1 to 2. It is highly unexpected that polymers which in theory range from being soluble to insoluble with an aggressive substance to be packed fulfill the requirements set for films according to the disclosure as is supported by the examples provided here with.

The base layer, which is water and/or oxygen resistant, is selected from the group consisting of a metal foil, preferably aluminum foil, a polymer, such as a polymer made from polyamide, polyvinylidene chloride, silicium or aluminium oxide coated polyesters, and/or fluro polymers.

According to the disclosure water and/or oxygen resistance is preferably encompassing materials having an oxygen transfer rate (OTR) equal to or below 1 cm3/m2/24 hr/bar according to ASTM standard D3985 at 23° C. and 0% RH and/or water (or moisture) vapor transfer rate (WVTR) equal to or below 1 g/m2/2 4hr according to ASTM standard F1249 at 38° C. and 90% RH, preferably both the WVTR and the OTR are below 0.01 g/m2/24 hr or 0.01 cm3/m2/24 hr/bar respectively.

According to the disclosure, the base layer of the film is selected to provide a number of properties to the film and a laminate and packaging comprising the film. The base layer may give desired barrier and support properties to the final laminate. Furthermore, the base layer may in one embodiment be a gas and water impermeable base layer, more preferably a water and/or oxygen resistant base layer.

In embodiments where the contact layer is hygroscopic the base layer is preferably made of a metal foil, preferably aluminum.

Aluminum is price competitive, a superior barrier of all gases and moisture and furthermore similar to other metal-like materials aluminium has good dead-fold properties, i.e. it does not unfold once folded, it reflects radiant heat, and gives a decorative appeal to laminates and packages.

According to the disclosure the tie layer is selected to provide sufficient adhesion between the base layer and the coextrusion layer. The tie layer may give melt strength and support the coextrusion coating of both the tie layer and the contact layer. It is preferred that the melting profile of the tie layer polymers and the contact layer polymers are in the same range to provide optimal films that do not separate. Preferably both layers comprise polymers that melt at the operating temperature of the process of the disclosure and even more preferred the melting profiles (i.e. melting points) should differ with less than 30° C., preferably with 0-15° C., such as 5-15° C.

In one embodiment the tie layer is made of 1, 2, 3, 4 or 5 layers. In this way, the properties of the film and resulting laminates and packagings may be improved to accommodate the specific chemical and physical properties of the contact layer and/or the base layer.

In a further embodiment all the layers are coextruded with the contact layer for a simplified processing and for ensuring homogeneity of the layers.

In a further embodiment the tie layer is constituted of one layer where the layer is made of a copolymer made of a material selected from a copolymer of ethylene and acrylic acid, ethylene and methacrylic acid and a terpolymer comprising ethylene, acrylic ester and a third polymer, which third polymer is preferably a glycidyl methacrylate, and more preferably a maleic anhydride. Most preferably the tie layer has a melting profile similar to that of the contact layer.

According to the disclosure the contact layer must be chemically resistant to the aggressive substance and excipient if present ultimately to be packed. Further it must show an extreme low absorption of the aggressive substances migrating through the film or laminate. The degree of absorption for a given substances is typically dictated by the manufacturer of the substance but often the accepted values lie in the range of 0 to 1% (w/w). For some products up to 10% (W/W) is acceptable typically for products with a low initial API content. The absorption is calculated as the weight of API in packaging relative to the initial weight of the API in the commercial product.

Hence, in the context of the present disclosure aggressive chemical resistant film means that no more than 1% of the original amount of API to be packaged (or sometimes no more than 10%) is migrated into the packaging material after 24 weeks. Typically, the degree of uptake is complete after 12 weeks or less.

In one preferred embodiment the contact layer comprises a polymer selected from the group consisting of a cyclic olefin copolymer (COC), a polyamide (PA), or, an ethylene vinyl alcohol (EVOH).

In a further embodiment the tie layer and contact layer comprise the same polymer, such as a cyclic olefin copolymer (COC), a polyamide (PA), or, an ethylene vinyl alcohol (EVOH) the latter being particularly preferred.

The HSP and RED Values calculated using http://hansen-solubility.com, mentioned above resulted in the following values for the preferred polymers according to the disclosure using lidocaine/rivastigmine as solvent (API):

TABLE 1

HSP and RED values for preferred polymers according to the disclosure

| Polymer | D | P | H | RED value (chi) |
|---|---|---|---|---|
| Lidocaine/ Rivastigmine | 18.1 | 8.2 | 6.1 | — |
| PA 66 | 16 | 11 | 24 | 1.72 |
| COC | 18 | 3 | 2 | 1.32 |
| EVOH | 20.5 | 10.5 | 12.3 | 1.12 |

It has surprisingly been shown that when the contact layer comprises any of the polymers from the group above, having a relatively low RED (i.e. between 1 and 2) value a chemical resistant film and also laminate may be obtained even though the mentioned polymers chemically represent different polymer types. Tests have shown that the resistance of laminates in which the film is coated with the preferred polymers shows results unexpectedly superior to those of laminates coated/laminated with Barex®.

EVOH is normally used in laminates due to the superior oxygen barrier properties of EVOH. However, EVOH is known to be very hydrophilic and hydroscopic (i.e. has a high WVTR), hence it is surprising that a EVOH polymer is usable in the context of the present disclosure where water resistance is a desired property. Also, PA has typically been used in laminates due to the superior mechanical properties like tear strength or as a barrier. As for EVOH it is unexpected that PA may be used as a contact layer and/or co-extrusion layer (i.e., tie and contact layer) for providing a chemical resistant film due to the hydrophilic nature of PA.

Because of the hydrophilic nature of PA and EVOH, in a preferred embodiment, the film obtained according to the disclosure may be tightly packed in a moisture barrier, in particular if it has to be stored. The film or laminate according to the disclosure may be packed immediately after manufacture of the chemical resistant film or laminate and should be kept safely packed until further use, for example in a packing line.

COC has not previously been recognized as being suitable for extrusion coating and for the production of heat sealable laminates. Without the wish to be bound by any theory this is believed to be due to the stress which the polymer is subjected to during an extrusion process. The stress causes irregular heating and melting within the COC, resulting in the final film or laminate to be unacceptable from a visual point of view for use in various packaging industries. Hence, it is very surprising that the inventors of the present disclosure have succeeded in providing a coextrusion layer comprising COC as a contact layer for sealing aggressive substances. The inventors have found that an improved processing of COC is obtained when COC is coextruded with a tie layer having a glass transition temperature higher than or equal to that of a COC polymer such as a terpolymer of ethylene, acrylic ester and maleic anhydride. In another embodiment of the disclosure the tie layer has a melting point that differs from COC with 30° C. or less, preferably with 0-15° C., such as 5-15° C.

In a further embodiment, the melting point of the tie layer is at least the same as COC, preferably 5 to 30° C. higher, more preferably 15 to 30° C. higher than COC.

To obtain a satisfactory coextrusion layer it is important that the polymer constituting a contact layer and a copolymer constituting a tie layer are compatible with respect to the melting characteristic of the polymers and the copolymer. As an effect of having been able to process a chemical resistant laminate with a coextrusion layer laminated to a base layer, thin laminates may be obtained, and generally improved process ability during the manufacture of the laminates or wrappings are achieved.

Consequently, in one embodiment the tie layer or plurality of layers constituting the tie layer, has a loading in the range of 7 to 20 g/m2 and/or the contact layer has a loading in the range of 4 to 20 g/m2 and the loading of the film is not more than 40 g/m2.

In terms of the disclosure loading means the amount of polymer left, in the layer when the film has dried.

In a particular embodiment the contact layer of the coextrusion layer is made from a blend of at least two polymers. Using blends can be a means for reducing the costs and for adapting the physical and chemical properties of the co-extrusion process, such as reducing or increasing the melting temperature to comply with the profile of the tie layer(s) and the polarity of the blend to improve the adhesion properties of the layers and hence the robustness of the final product.

In a preferred embodiment the contact layer consists of one polymer type. Experiments showed that using one type of polymer resulted in improved resistance of the film and laminate towards the chemical substance to be packed.

According to an embodiment, in any of the blends or homo layers at least one of or all the polymer(s) forming the contact layer of the coextrusion layer is a cyclic olefin co-polymer, a polyamide, or, an ethylene vinyl alcohol. Each of the polymers are commercial available for example under the tradenames EVAL® C109B sold by Kuraray, Selar PA 3426 R sold by Dupont®, 6013M-07 sold by Topas®.

In one embodiment the cyclic olefin copolymer, a polyamide, or, an ethylene vinyl alcohol makes up at least 50% w/w of the blend, preferably at least 60% w/w, more preferably at least 80% w/w, most preferably at least 95% w/w.

The adhering of step iv) preferably occurs instantly for example by cooling the co-extrudate in cooling cylinders during the lamination process.

According to the disclosure a chemical resistant film has various applications. In an embodiment of the disclosure, the film is used to wrap a composition comprising a chemical selected from nicotine, fentanyl, lidocine and rivastigmine.

In a particular embodiment of the disclosure, wherein the composition is provided as a patch, the amount of the aggressive chemical substance remaining at day 0 after storage for at least 7 days at 40° C. is a maximum +/−10% in comparison to a Barex® patch as index 100.

In a further aspect of the disclosure an aggressive chemical resistant film is provided, said film comprising at least a base layer, which is water and/or oxygen resistant, and a coextrusion layer, wherein the coextrusion layer comprises a tie layer and a contact layer, and whereby the tie layer comprises at least one layer and wherein the contact layer comprises a polymer having a RED value of >0.8, more preferred a RED value in the range of 0.8 to 10, even more preferred 0.8 to 5, and most preferred 1 to 2. Films according to the disclosure are resistant to aggressive chemical substances.

The term "aggressive chemical resistant film" means a film which when in contact with an aggressive substance does not allow more than 10%, such as 5% w/w or 1.5% w/w based on the nominal content of the aggressive chemical to migrate to the packaging material.

In one embodiment the base layer, which is water and/or oxygen resistant, is selected from the group consisting of metal foil, preferably aluminum foil, polymers, polyamide, polyvinylidene chloride, silicium oxide coated polyesters, and/or fluropolymers.

In a further embodiment the tie layer is constituted of one layer and wherein the layer is a copolymer made of a material selected from a copolymer of ethylene and acrylic acid, ethylene and methacrylic acid and a terpolymer comprising ethylene, acrylic ester and a third polymer, which third polymer is preferably a glycidyl methacrylate, and more preferably a maleic anhydride.

In a particular embodiment the contact layer comprises or is a polymer selected from the group consisting of a cyclic olefin copolymer, a polyamide, or, an ethylene vinyl alcohol.

In yet an embodiment the tie layer and the contact layer is the same material.

In a further embodiment the film is heat sealable. A heat sealable film or laminate is a laminate that is capable of sealing to itself during heat sealing without creating any deformation of films or laminates, which is highly undesired, especially, during the final wrapping of the product. The deformation is undesirable in relation to quality assurance, where any deformation must be noted and explained, which is highly labor intensive. Furthermore, the legislation in many countries is very strict. Hence, film and/or laminates with any deformation are not allowable for packing active ingredients.

In yet another aspect the disclosure relates to a laminate for packing an aggressive chemical substance said laminate comprising at least
- a first outer layer made of a mechanically wear resistant material;
- an aggressive chemical resistant film as described above comprising a base layer, which is water and/or oxygen resistant and a coextrusion layer said coextrusion layer comprising a tie layer wherein the base layer side of the film is facing the first outer layer.

In one embodiment the first outer layer may be made from a material selected from but not limited to paper, polyethylene or polyamide based sheets, ortho-phthalaldehyde based sheets, or polyester based sheets, or combinations. It is preferred that the first outer layer is a combination of materials when polyester based sheets are used.

In an embodiment the first outer layer and the film are laminated to provide the packaging in one piece. Laminating the first outer layer to the film provides a strong laminate, which is easy to wrap, and, it is ensured that the individual parts of the laminate do not fall apart.

In another embodiment the laminate further comprises a second outer layer facing the exterior side of the first outer layer, preferably the second outer layer is a paper layer. The paper layer is typically printed with the name, color and/or logo of the product and manufacturer of the product. It is also contemplated that the first outer layer is printed.

It is also contemplated that an adhesive agent may be applied between the second and first outer layers. The adhesive layer may be the same or different from the tie layer. Additional suitable adhesives are adhesives approved for use in packaging products for human use and are well known to the skilled person. A suitable adhesive may be selected from but is not limited to polyurethane based adhesives, epoxy based adhesives, or acrylic based adhesives.

The laminate of the present disclosure must be inert and impermeable to the aggressive chemical substance which the laminate is wrapped around. Hence, in an embodiment of the disclosure a maximum of 10%, preferably a maximum of 5%, even more preferably a maximum of 1.5%, most preferably a maximum 0.5% of the aggressive chemical is migrated into the laminate at day 0 after 12 weeks of storage at 40° C.

In a further embodiment the laminate encloses a compound selected from the group consisting of nicotine, rivastigmine, fentanyl and lidocaine. These compounds are known as aggressive chemicals/compounds and require specialized packaging.

Hence, the disclosure also contemplates an aggressive chemical substance packed in a laminate or packaging as explained above and a method for providing the packaging the chemical substance, said method comprising the steps of:
a) providing a base layer
b) coextruding a layer comprising a tie layer and a contact layer to provide a coextrusion layer;
c) coating the coextrusion layer to the base layer;
d) allowing the coextrusion layer coated to the base layer to adhere to the base layer to provide a chemical resistant film comprising the tie layer and the contact layer formed as an coextrusion layer coated to the base layer;
e) providing a highly aggressive substance to the contact layer side of the film; and
f) sealing the chemical resistant film, preferably by heat sealing, in such a way to provide a hollow interior space for sealing the highly aggressive substance, said hollow space having an interior side and an exterior side, wherein the interior side of the film is the contact layer of the coextrusion layer and the exterior side of the film is the base layer.

In a preferred embodiment the highly aggressive substance is selected from the group consisting of nicotine, lidocaine, rivastigmine, and fentanyl.

It is also contemplated that a first outer layer may be applied to the film; the first outer layer is made of a mechanically wear resistant material and typically serves to protect from children being able to break the sealed film, laminate or wrapping.

A packaging should preferably comply with International standards such as 16 CFR § 1700.20 (for USA) and ISO 8317 (2003) corresponding to DIN EN ISO 8317 (2004) (for Europe).

A "packaging" is in the context of the disclosure intended to mean a film or laminate used to pack a substance. Packaging may be used interchangeably for film or laminate.

It is also contemplated that a second outer layer may be applied to the film and/or laminate; the second outer layer is typically a paper layer. The paper layer is typically printed with the logo or colors etc. of the supplier of the product. The second outer layer is preferably applied when there is a first outer layer.

It is contemplated that the first and/or second outer layer is laminated to the film before steps e) and 0 for example in one combined coextrusion and laminating step.

In yet another aspect, the disclosure provides the use of a polymer having a RED value of >0.8, preferably having a RED value in the range of 0.8 to 10, more preferred 0.8 to 5, and most preferred 1 to 2 as a contact layer for providing chemical resistance to a film, wherein the film comprises a base layer which is water and/or oxygen resistant coated to a, optionally coextruded, layer comprising a tie layer and the contact layer.

In a further embodiment the polymer is selected from the group consisting of a cyclic olefin copolymer, a polyamide, or, an ethylene vinyl alcohol.

Specific films according to the disclosure comprise but are not limited to base layer/tie-layer/contact-layer (the latter two coextruded) EAA/PE/COC, EAA/EMA/COC, EAA/terpolymer/COC, terpolymer/PE/COC, EAA/terpolymer/EVOH, EAA/terpolymer/PA, or EAA/PA.

Specific films according to the disclosure that are resistant to nicotine comprise but are not limited to base layer/tie-layer/contact layer (the latter two coextruded) Al/EAA/PA, Al/terpolymer of EAE and maleic anhydride/EVOH 60% and PE 40%, Al/terpolymer of EAE and maleic anhydride/EVOH 100%, Al/EVOH/EVOH, AL/EAE and maleic anhydride/COC.

In an embodiment of the disclosure, wherein the film is resistant to nicotine and the contact layer is COC and the base layer is aluminium, the tie-layer is preferably a terpolymer of ethylene, acrylic ester and maleic anhydride.

In a further embodiment of the disclosure, wherein the film is resistant to nicotine and the contact layer is PA and the base layer is aluminium, the tie-layer is preferably a co-polymer of ethylene and acrylic acid.

In yet another embodiment of the disclosure, wherein the film is resistant to nicotine and the contact layer is EVOH and the base layer is aluminium, the tie-layer is preferably EVOH and/or a terpolymer of ethylene, acrylic ester and maleic anhydride.

Specific films according to the disclosure resistant to rivastigmine comprise but are not limited to base layer/tie-layer/contact layer (the latter two coextruded) Al/EAA/PA, Al/terpolymer of EAE and maleic anhydride/EVOH 60% and PE 40%, Al/terpolymer of EAE and maleic anhydride/EVOH 100%, Al/EVOH/EVOH, AL/EAE and maleic anhydride/COC.

In an embodiment of the disclosure, wherein the film is resistant to rivagstigmine and the contact layer is COC and the base layer is aluminium, the tie-layer is preferably a terpolymer of ethylene, acrylic ester and maleic anhydride.

In a further embodiment of the disclosure, wherein the film is resistant to rivagstigmine and the contact layer is PA and the base layer is aluminium, the tie-layer is preferably a copolymer of ethylene and acrylic acid.

In yet another embodiment of the disclosure, wherein the film is resistant to rivagstigmine and the contact layer is EVOH and the base layer is aluminium, the tie-layer is preferably EVOH and/or a terpolymer of ethylene, acrylic ester and maleic anhydride.

Specific films according to the disclosure resistant to lidocaine comprise but are not limited to base layer/tie-layer/contact layer (the latter two coextruded) Al/EAA/PA, Al/terpolymer of EAE and maleic anhydride/EVOH 60% and PE 40%, Al/terpolymer of EAE and maleic anhydride/EVOH 100%, Al/EVOH/EVOH, AL/terpolymer of EAE and maleic anhydride/COC.

In an embodiment of the disclosure, wherein the film is resistant to lidocaine and the contact layer is COC and the base layer is aluminium, the tie-layer is preferably a terpolymer of ethylene, acrylic ester and maleic anhydride.

In a further embodiment of the disclosure, wherein the film is resistant to lidocaine and the contact layer is PA and the base layer is aluminium, the tie-layer is preferably a co-polymer of ethylene and acrylic acid.

In yet another embodiment of the disclosure, wherein the film is resistant to lidocaine and the contact layer is EVOH and the base layer is aluminium, the tie-layer is preferably EVOH and/or a terpolymer of ethylene, acrylic ester and maleic anhydride.

Specific films according to the disclosure resistant to fentanyl comprise but are not limited to base layer/tie-layer/contact layer (the latter two coextruded) Al/EAA/PA, Al/terpolymer of EAE and maleic anhydride/EVOH 60% and PE 40%, Al/terpolymer of EAE and maleic anhydride/EVOH 100%, Al/EVOH/EVOH, AL/terpolymer of EAE and maleic anhydride/COC.

In an embodiment of the disclosure, wherein the film is resistant to fentanyl and the contact layer is COC and the base layer is aluminium, the tie-layer is preferably a terpolymer of ethylene, acrylic ester and maleic anhydride.

In a further embodiment of the disclosure, wherein the film is resistant to fentanyl and the contact layer is PA and the base layer is aluminium, the tie-layer is preferably a co-polymer of ethylene and acrylic acid.

In yet another embodiment of the disclosure, wherein the film is resistant to fentanyl and the contact layer is EVOH and the base layer is aluminium, the tie-layer is preferably EVOH and/or a terpolymer of ethylene, acrylic ester and maleic anhydride.

The disclosure should not be restricted to the above combinations. Further combinations are within the scope of the disclosure.

In another aspect of the disclosure is provided a method for providing an aggressive chemical resistant film said film being resistant to nicotine, rivastigmine and/or and lidocaine, and wherein said method comprises the steps of:
i) providing a base layer, which is water and/or oxygen resistant;
ii) coextruding a layer comprising a tie layer and a contact layer to provide a coextrusion layer;
iii) coating the coextrusion layer to the base layer;
iv) allowing the coextrusion layer coated to the base layer to adhere to provide the aggressive chemical resistant film comprising the tie layer and the contact layer formed as a coextrusion layer coated to the base layer, wherein the tie layer comprises at least one layer and wherein the contact layer comprises a polymer having a RED value based on Hansens Solubility parameter (HSP) towards nicotine, rivastigmine and/or lidocaine of >0.8, more preferred a RED value in the range of 0.8 to 10, even more preferred 0.8 to 5, and most preferred 1 to 2.

It has surprisingly been shown that films provided from polymers having a red value between 0.8 and 10 relative to rivastigmine, lidocaine and/or nicotine and coextruded as stipulated above have superior resistance to said chemical substances.

In a further aspect of the disclosure is provided a method for providing an aggressive chemical resistant film against nicotine, rivastigmine and/or and lidocaine, said method comprising the steps of:
i) providing a base layer, which is water and/or oxygen resistant;
ii) coextruding a layer comprising a tie layer and a contact layer to provide a coextrusion layer;
iii) coating the coextrusion layer to the base layer;
iv) allowing the coextrusion layer coated to the base layer to adhere to provide the aggressive chemical resistant film comprising the tie layer and the contact layer formed as a coextrusion layer coated to the base layer, wherein the tie layer comprises at least one layer and wherein the contact layer comprises a polymer from the group consisting of a cyclic olefin copolymer, a polyamide, or, an ethylene vinyl alcohol.

It has surprisingly been shown that polymers of cyclic olefin copolymer, polyamide and ethylene vinyl alcohol, when coextruded, provide a resistant film, which performs at least as well as films known in the prior art for packaging compounds such as nicotine, lidocaine and rivastigmine.

Conveniently, the polymers used in the present disclosure have the advantage of being easy accessible thereby providing a more cost efficient production.

BRIEF DESCRIPTION OF THE FIGURES

FIG. 4 shows the results of an absorption study of rivastigmine as API wrapped in laminates according to the disclosure as compared to a commercial available laminate with the commercial available polymer film Barex® after storing for 2, 4, 8 and 12 weeks at 40° C.

DETAILED DESCRIPTION

Figure 1:
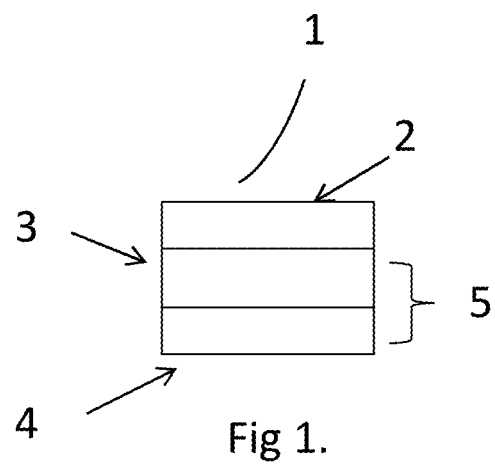
FIGS. 1 is a cross section of an embodiment of a chemical resistant film according to the disclosure.

The disclosure will now be described in greater details. Each specific embodiment and variation of features applies equally to each aspect of the disclosure unless specifically stated otherwise.

The film, laminate and packaging according to the present disclosure is intended to be used in packaging highly aggressive substances such as nicotine, rivastigmine, fentanyl or lidocaine, however, the disclosure should not be limited to these specific substances.

The term "film" according to the disclosure contemplates a product comprising a base layer coated with a coextrusion layer comprising a tie layer and a contact layer or a base layer laminated with a tie layer and a contact layer.

Where the contact layer is laminated, for example using an EVOH film, the contact layer and tie layer may be either coextruded, or, the contact film layer may be laminated to the base layer optionally with an intermediate tie layer or the tie and contact layers may be the same material.

The term "laminate" according to the disclosure contemplates the film to which a further layer is laminated, such as a first outer layer.

A "packaging" is in the context of the disclosure intended to mean a film or laminate used to pack a substance. Packaging may be used interchangeably for film or laminate.

The term "highly aggressive substance" should be understood as a substance which is both very reactive with metals, acids, bases or functional groups such as ketones, alcohols, hydro carbons and/or esters, and/or, volatile but also easily migrates through barriers. Similarly, the term "aggressive chemical resistant film" means a film which when in contact with an aggressive substance does not allow more than 1.5% w/w of nominal content to migrate to the packaging material or that 90-110% w/w of the aggressive chemical substance remains in the product when compared to Barex® as index 100.

Therefore, the films, laminates or packagings applicable for packing highly aggressive substances should have both chemical-resistant properties but also limit the migration of the aggressive substance through the film, laminate or packaging. The aggressive substance according to the disclosure is also or alternatively susceptible to degradation when exposed to ambient conditions, such as oxygen and water, it is volatile and able to migrate or a combination. Specifically, the aggressive substance is selected from but not limited to nicotine, oils, such as spearmint and peppermint oil, licodaine, fentanyl or rivastigmine.

The term "oxygen and water resistant" as used in the context of the present disclosure contemplates material for which the oxygen transfer rate (OTR) and/or water vapor transfer rate (WVTR) is no more than 1 preferably no more than 0.1 as also indicated above. The term WVTR may also be referred to as the moisture vapor transfer rate (MVTR). WVTR and MVTR are equivalent.

The term "mechanically wear resistant layer" as used for the first outer layer in the context of the present disclosure should be a material which is suitable for the manufacture of a flexible packaging. The mechanically wear resistant layer may be chosen from materials such as polyethylene or polyamide based sheets, ortho-phthalaldehyde based sheets, or polyester based sheets or combinations.

Further, the mechanically wear resistant material can be provided as a film that is biaxially oriented to give the film higher seal strength. The term "biaxial oriented" should be understood such that the provided polymer film has been stretched in both a longitudinal and a transverse direction during manufacturing.

The term "exterior side" should be understood in its broadest term. The term exterior environment is used for defining the direction opposite of the side that is facing the highly aggressive substance to be sealed by a laminate or packaging of the present disclosure. This means that the term exterior environment is independent on whether additional layers are coated, laminated or otherwise attached to the film. Thus, the word is used for specifying which direction a side of a layer is facing.

The various embodiments of the disclosure will now be illustrated with references to the figures and examples.

With reference to FIG. 1 a film of the disclosure will now be described in greater detail. The extreme chemical resistant film, 1, is obtained by providing a base layer, 2. A coextrusion layer, 5, comprising a tie layer, 3, and a contact layer, 4, is coated to one side of the base layer, 2, according to the method of the disclosure and is allowed to adhere. The base layer, 2, and the coextrusion layer, 5, define the film according to all the aspects of the disclosure. Consequently, the film is provided with a base layer side, 2, and a coextrusion layer side 5, wherein the base layer side, 2, is intended for facing the exterior environment and the co-extrusion layer side, 5, is intended for facing the highly aggressive substance to be sealed.

The coextrusion layer may be coated to the aluminium layer by a coextrusion system generally known in the art to provide the coextrusion layer coated on the first side of the aluminum layer. The coextrusion layer may be applied in an amount of 7-40 g/m3. After coating of the aluminium layer and subsequently cooling, the coextrusion layer is adhered to the side of the tie layer facing away from the aggressive chemical substance.

The coextrusion is preferably performed at a temperature of 240-330° C., more preferred 270-300° C. and the speed of the application/coating is in the range of 150 to 600 m/min. The equipment suitable for extruding and laminating films and laminates according to the disclosure may be obtained from Bobst.

When using coextrusion, it is possible to obtain a multi layer which is thinner than multilayer layers provided by sequential film application techniques without compromising the extreme chemical resistance properties of the first laminate. Hence, the present disclosure does not only provide an extreme chemical resistance laminate, and packaging comprising the same but at the same time the manufacturing process is more cost effective since less polymer, forming the contact layer, has to be used.

Figure 2:
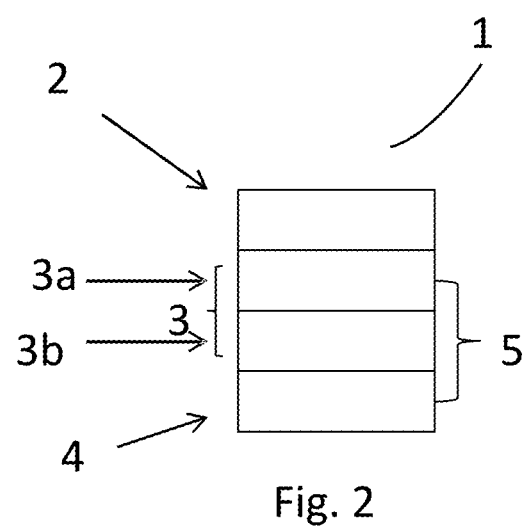
FIG. 2 is a cross section of another embodiment of a chemical resistant film according to the disclosure.

Another embodiment of a film in which the tie layer comprises two layers is illustrated in FIG. 2. The extreme chemical resistant film, 1, is obtained by providing a base layer, 2. The coextrusion layer, 5, comprises a tie layer, 3, comprising a first layer, 3a, and a second layer, 3b, and a contact layer 4. The coextrusion layer is coated onto one side of the base layer, 2, according to the method of the disclosure and is allowed to dry.

In the embodiment illustrated, the tie layer, 3, comprises two layers. These layers may be made of EAA as the first layer, 3a, and polyethylene (PE) as the second layer, 3b, where the first layer of EAA faces the base layer and second layer of the PE faces the contact layer, 4.

The extreme chemical resistant film according to the disclosure is intended for use as a component of a packaging suitable for sealing a highly aggressive substance. The film may constitute the packing itself.

Figure 3:
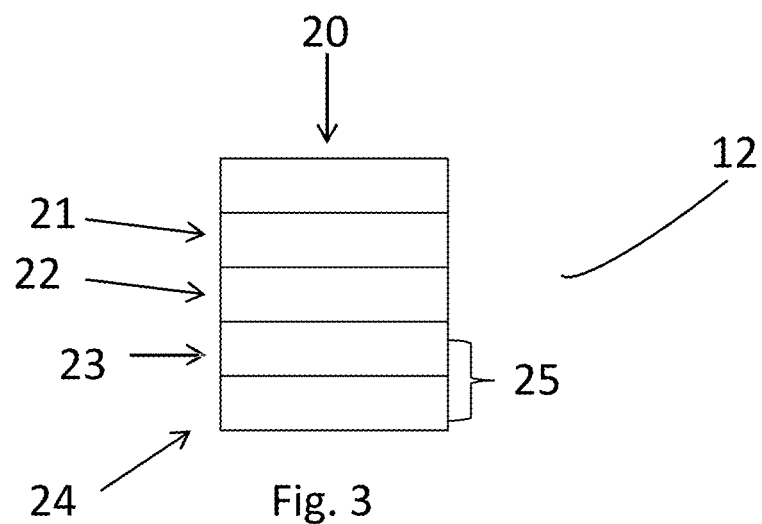
FIG. 3 is a cross section of a laminate according to the disclosure.

To further improve the mechanical wear resistance of the film a first outer layer may be laminated to the base layer side of the film or simply be wrapped around the film to provide a laminate. Hence, in FIG. 3 is illustrated a cross section of an embodiment of a laminate according to the disclosure, 12, comprising a first outer layer, 21, a base layer, 22, and a coextrusion layer, 25. The first outer layer, 21 and the base layer side, 22, may be laminated together before, during or after the coextrusion layer 25 is applied/coated to the base layer.

The first outer layer, 21, is a mechanically wear resistant layer which adds safety properties to the wrapping ensuring that the wrapping is not inadvertently opened. Hence, the outer layer can also be seen as a child proof layer meaning that the layer is made of a material and is sealable in such a way that it is difficult for children to open. Additionally, the outer layer may be provided with a second outer layer, 20.

The second outer layer, 20, is typically a paper layer, wherein the paper layer is facing the exterior environment; the exterior facing side of the second layer may be printed as desired. The second outer layer, such as the paper layer is added to improve the stiffness of the packaging in addition to providing a printing platform.

Furthermore, it is within the inventive concept of the present disclosure that an adhesive agent is applied between the first outer layer and the base layer and/or between the first outer layer and the second outer layer. The obtained packaging may then be assembled in such a way that the various layers do not part during handling, printing and/or packaging of the substance to be packed.

After production, the film, laminate or packaging may be stored as rolls ready for use in further lamination or packaging of the aggressive substance to be packed.

In use, the packaging is sealed around the substance to be packed so that the contact layer of the coextrusion layer faces the interior side and the substance, and, the base layer, first outer layer or second outer layer, as applicable, face the exterior side, so as to create a hollow interior for containing the, substance, such as the aggressive substance.

The sealing of the packaging is achieved in such way that the contact layer of the coextrusion layer is facing the aggressive substance so that the remaining part of the package is protected by the contact layer of the coextrusion layer. In this way, the aggressive substance is encompassed by the inner side of packaging and will therefore only have direct contact with the contact layer of the coextrusion layer.

In general, the order in which the different layers of the packaging according to the disclosure are applied to the base layer is flexible. Hence, the first outer layer may be applied before the coextrusion layer and the other way around. The order depends on which production line is suitable in a specific situation.

In more details the packaging according to the present disclosure may in one embodiment be manufactured by obtaining a film comprising a base layer, such as an aluminum layer and a coextrusion layer comprising a biopolymer of ethylene and acrylic acid as a tie layer and EVOH as the contact layer coated to the aluminium as described above. The base layer side of the film may then be provided with an adhesive agent and subsequently laminated to a biaxial orientated PET-film which is the first outer layer, i.e. the mechanically wear resistant layer. The PET-film is further provided with an adhesive agent on the exterior side of the mechanically wear resistant layer and is subsequently laminated to a paper layer for providing the final packaging.

An aggressive substance, such as but not limited to lidocaine, is placed on the contact layer side of the laminate which is welded around the substance, such as to form a pouch with an inner side and an outer side. Accordingly, the interior of the pouch consists of the coextrusion layer, where the contact layer of EVOH facing the aggressive substance thereby protects the rest of the provided packaging and the exterior side is the paper layer.

In general, the lamination procedure for laminating the mechanically wear resistant or paper layer to each other or to the base layer is routine procedure for the person skilled in the art.

According to all aspects of the disclosure the base layer may be selected from but not limited to a metal foil, preferably aluminum foil, a polymer, such as a polymer made from polyamide, polyvinylidene chloride, silicium or aluminium oxide coated polyesters, and/or fluro polymers, such as commercial Alu foil from e.g. Hydro, or AlOx coated PET films obtainable from e.g. Toray Films Europe, or SiOx coated PET films obtainable from e.g. Celplast under the tradename Ceramis.

According to all aspects of the disclosure the tie layer may be made of a material selected from but not limited to a copolymer made of a material selected from a copolymer of ethylene and acrylic acid, ethylene and methacrylic acid and a terpolymer comprising ethylene, acrylic ester and a third polymer, which third polymer is preferably a glycidyl methacrylate, and more preferably a maleic anhydride, such as the commercial product Lotader® 3410 sold by Arkema or Nucrel® 0609HSA sold by Dupont®.

According to all aspects of the disclosure the contact layer may be made of a material selected from cyclic olefin copolymer, a polyamide, or, an ethylene vinyl alcohol or mixtures thereof, such as the commercial products EVAL® C109B sold by Kuraray, Selar Pa. 3426 R sold by Dupont® or COC 6013M-07, COC 8007F-600, or 9506F500 sold by Topas® or EVOH obtainable from Nippon Gohsei under the tradename Soarnel.

According to all aspects of the disclosure the first outer layer may be made of a material selected from paper, polyethylene or polyamide based sheets, ortho-phthalaldehyde based sheets, or polyester based sheets, or combinations, such as the commercial product F-PAP sold by Flexpet.

The disclosure will now be illustrated in more details with reference to the following non limiting examples.

RED Calculation

Determination of the HSP values and interaction radius for nicotine, rivastigmine, fentanyl and lidocaine requires that the solubility of the drug is evaluated against at least 16 solvents having a range of polar and hydrogen bonding properties. The methodology of determining HSP values, interaction radius and RED values are described in C. M. Hansen: "Hansen Solubility Parameters, A User's Handbook", CRC Press, 2007, Second Edition and exemplified in EP 2 895 531.

Typical solvents used to determine the HSP may be but is not limited to the solvents present in table 2.

TABLE 2

Typical solvents used to determine the
HSP of a polymer or substance of interest.
Typical solvents used in Determining of HSP
of rivagstigmine, lidocaine, fentanyl and nicotine

| Chemical name | Trade Designation or Alternate Name |
|---|---|
| Acetonitrile | Acetonitrile |
| Ethylene glycol n-Butyl Ether | Butyl CELLOSOLVE ™ Glycol Ether |
| Dibutyl Ether | Dibutyl Ether |
| Dimethyl Formamide | Dimethyl Formamide |
| Dimethyl Sulfoxide | Dimethyl Sulfoxide |
| Methanol | Methyl alcohol |
| 2-Butanone | Methyl Ethyl Ketone |
| 4-Methyl-2-pentanone | Methyl Isobutyl Ketone |
| n-Butyl Acetate | n-Butyl Acetate |
| n-Heptane | n-Heptane |
| 1-Propanol | n-Propyl Alcohol |
| o-Dichlorobenzene | 1,2-Dichlorobenzene |
| Tetrahydrofuran | Tetrahydrofuran |
| Toluene | Methylbenzene |
| Propylene Carbonate | Propylene Carbonate |
| Water | Water |

For assessing the solubility of Rivastigmine, Lidocaine, fentanyl and nicotine in the solvents an experimental measurement is performed. The solubility is assesed based on the visual observation of 0.5 g of the chemical substance in a vial with 5 cm3 solvent at room temperature. The vial is capped with a polyethylene-lined lid and labeled with the solvent loaded. The vials are placed in a vial shaker at low speed at room temperature. After 24 hours, the samples are removed from the vial shaker, and allowed to sit for 30 min before they are visually rated. The rating is performed by giving each solvent a score being 0 for insoluble and 1 for soluble. The numerical ratings are then entered into the HSPiP software program to obtain the HSP (Hansen solubility parameters). R (radius) values for the compound of relevance, e.g. nicotine, rivastigmine, fentanyl and/or lidocaine is inserted, and a report is generated. The report lists the final parameters and R values calculated for nicotine, rivastigmine, fentanyl and/or lidocaine. The report also lists the solvents used in the evaluation, their HSP values (taken from a database), the rating of the visual observations, and their RED values with a specific polymer of interest.

EXAMPLE 1—Performance of a Laminate According to the Disclosure Compared to a Commercially Used Laminate A study was conducted to evaluate the performance of four laminates according to the present disclosure as compared to a commercially available laminate product comprising Barex® as the contact layer.

The wrappings according to the disclosure were compared to the performance of a Barex® laminate currently used in the field.

The test is a resistance test, wherein the migration of rivastigmine to the laminates is evaluated.

TABLE 3

The composition of the 6 wrappings was a follows, laminates
1 to 5 are laminates according to the disclosure

| | Adhesive/Polymer layer Coextrusion layer | Base layer | First outer layer | Second Outer layer |
|---|---|---|---|---|
| Commercially used Barex ® laminate (prior art) | Adhesive/ Barex ® film | Al | PET | Paper |
| Laminate 1 | Tie layer: Bipolymer of ethylene and acrylic acid (Nucrel 0609 HAS) Contact layer: PA (Selar PA 3426R) | Al | PET | |
| Laminate 2 | Tie layer: Terpolymer of ethylene, acrylic ester and maleic anhydride (Lotader 3410) Contact layer: EVOH 60% (EVAL C109B) and PE 40% | Al | PET | |
| Laminate 3 | Tie and contact layer: EvOH film (EVAL C109B) | Al | PET | |
| Laminate 4 | Tie layer: Terpolymer of ethylene, acrylic ester and maleic anhydride (Lotader 3410) Contact layer: EVOH 100% (EVAL C109B) | Al | PE | PET |
| Laminate 5 | Tie layer: Terpolymer of ethylene, acrylic ester and maleic anhydride (Lotader 3410) Contact layer: COC | Al | PE | PET |

*Between the paper/PET, PET/Al, and Al/EVOH film layers an adhesive was applied.

Laminates 1 to 5 were obtained according to the method of the disclosure. For laminates 1, 2, 4 and 5 a coextrusion layer was coated to the base layer and in laminate 3 the combined tie and contact layer was laminated to the base layer. For the co-extrusion layers, the loading of the tie layers was between 4-18 g/m2 and the loading of the contact layer was 8-12 g/m2.

The resulting laminates were wrapped around a patch containing rivastigmine as API and the migration of the API to the packaging material/wrapping was measured after 2, 4, 8 and 12 weeks at 40° C. The API in the wrapping was measured by extracting the packaging and analysing the amount of API therein using Mass spectrometry.

The Rivastigmine patches tested were commercially available patches originally containing 9.5 mg API/patch.

Figure 4:
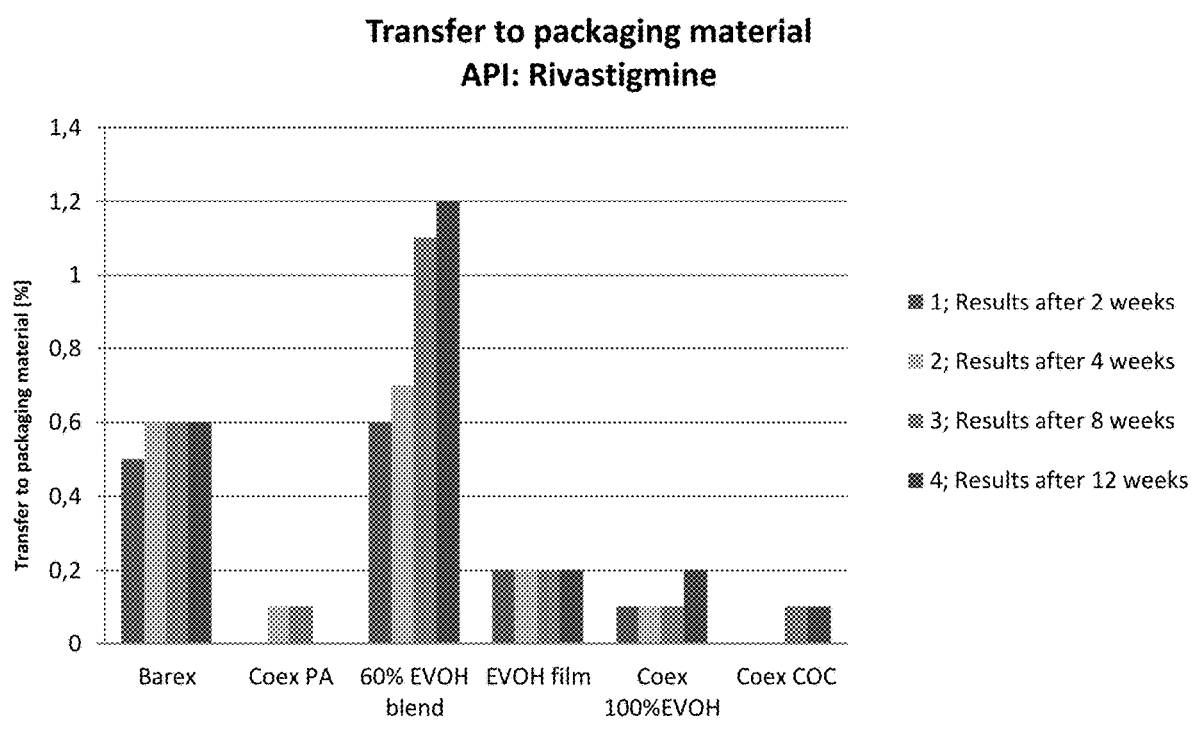

The results are shown in FIG. 4 illustrating the resulting migration of rivastigmine (weight API extracted from the laminate) to the laminate in percentage of the content of the original patches of 9.5 mg.

The columns are denoted 1, 2, 3 and 4 respectively to the order they are shown from left to right in FIG. 4. Hence column 1 (furthest to the left) for each contact layer polymer used shows the results for the 6 laminates after two weeks. Column 2 shows the results for the 6 laminates after four weeks. Column 3 shows the results for the 6 laminates after 8 weeks, and column 4 shows the results for the 6 laminates after 12 weeks.

The Barex® laminate is a reference known for applicability in the art and comparison were made for evaluating the properties of the laminates according to present disclosure.

From the figure it is clear that the results for laminates according to the disclosure obtained by coextrusion of either of EVOH, PA, or COC as well as laminating EVOH provides for an improved chemical resistant laminate compared to the commercially used Barex® laminate, meaning that less migration occurs.

Also, a contact layer, illustrated as laminate 2, of a blend of EVOH and PE was prepared and tested. Though the properties of this blend with rivastigmine as API resulted in a higher migration of the API than Barex®, the rate is still below the limit demanded in the industry and hence, it illustrates that blends as provided in laminate 2 are usable alternatives to Barex® as well. Surprisingly though the tie/contact layer made of 100% EVOH was markedly superior to the blend.

Also, a contact layer, illustrated as laminate 3, a film of EVOH laminated to aluminum was prepared and tested. Surprisingly, it was shown that the use of EVOH in the form of a film laminated to aluminum provided a chemical resistant laminate.

EXAMPLE 2—Stability Test of a Chemical Substance Wrapped in Laminates According to the Disclosure and Wrapped in a Prior Art Product using Barex®

Similar to the test described in example 1, laminates according to the disclosure were prepared as outlined in table 4 below. A lidocaine patch containing 40 mg lidocaine was wrapped in the pouch, packaged and stored at 40° C. for seven days.

TABLE 4

Packagings for lidocaine stability test.

| Barex Commercially used Barex ® laminate (prior art) | COC coex same as laminate 5 of example 1 | Coex EVOH same as laminate 4 of example 1 |
|---|---|---|

Figure 5:
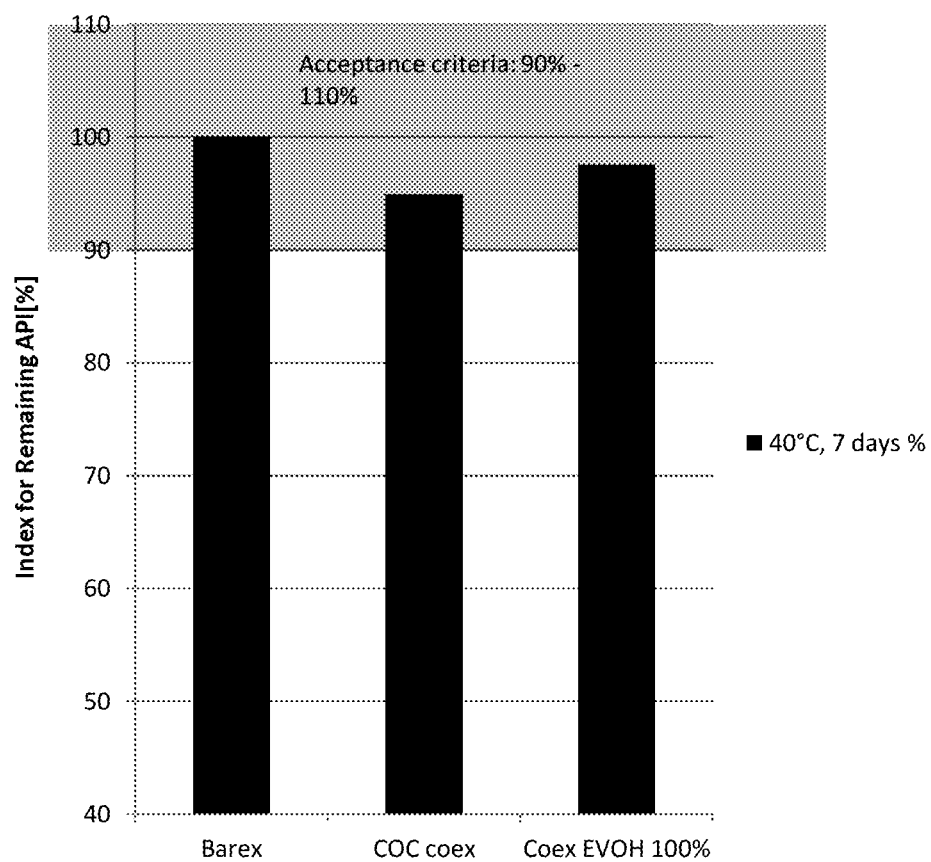
FIG. 5 shows the amount of licodaine remaining in a patch after 7 days at 40° C. for embodiments of the laminate according to the disclosure and in comparison, with a commercial available Barex® laminate.

Stability of the API is important to ensure that the dose indicated on the packaging is correct. A value of 90% -110% of the original dose after one week when stored at 40° C. using Barex® as index 100 is considered acceptable. FIG. 5 illustrates the results of the test where the y-axis indicates the weight decrease of the two laminates according to the disclosure using Barex as index 100.

As can be seen from FIG. 5, both inventive laminates have a lower value than the index 100 Barex® comparative product, however with a value within the acceptable limits. The lower % value of the laminates according to the disclosure indicates that more lidocaine has disappeared from the patch.

The invention claimed is:

1. A film, comprising:
   a base layer comprising aluminum, wherein the base layer is resistant to one or more of water or oxygen; and
   a coextrusion layer consisting of a multi-layer tie layer and a contact layer, wherein:
   the contact layer consists of a cycloolefin copolymer (COC),
   the multi-layer tie layer is positioned in between the base layer and the contact layer,
   a loading of a first layer of the multi-layer tie layer is in the range of 10 to 14 $g/m^2$, and
   a loading of a second layer of the multi-layer tie layer is in the range of 10 to 14 $g/m^2$,
   wherein the film is resistant to nicotine, fentanyl, rivastigmine, or lidocaine.

2. The film according to claim 1, wherein a loading of an entirety of the multi-layer tie layer is in the range of 14 to 40 $g/m^2$.

3. The film according to claim 1, wherein a loading of at least a portion of the multi-layer tie layer is in the range of 14 to 40 $g/m^2$.

4. The film according to claim 1, wherein the coextrusion layer is coextrusion coated to the base layer.

5. The film according to claim 1, wherein the first layer of the multi-layer tie layer comprises acrylic acid and the second layer of the multi-layer tie layer comprises polyethylene.

6. The film according to claim 5, wherein the acrylic acid is ethylene acrylic acid.

7. A laminate, comprising:
   a first outer layer; and
   a film, wherein the film is resistant to nicotine, fentanyl, rivastigmine, or lidocaine, and wherein the film comprises:
   a base layer comprising aluminum that is resistant to one or more of water or oxygen; and
   a coextrusion layer consisting of a multi-layer tie layer and a contact layer, wherein:
   the contact layer consists of a cycloolefin copolymer (COC),
   the multi-layer tie layer is positioned in between the base layer and the contact layer,
   a loading of a first layer of the multi-layer tie layer is in the range of 10 to 14 $g/m^2$, and
   a loading of a second layer of the multi-layer tie layer is in the range of 10 to 14 $g/m^2$, wherein a side of the chemical-resistant film comprising the base layer is adhered to the first outer layer.

8. The laminate according to claim 7, wherein a loading of an entirety of the multi-layer tie layer is in the range of 14 to 40 g/m$^2$.

9. The laminate according to claim 7, wherein a loading of at least a portion of the multi-layer tie layer is in the range of 14 to 40 g/m$^2$.

10. A film, comprising:
a base layer having a single layer consisting of aluminum that is resistant to one or more of water or oxygen; and
a coextrusion layer consisting of a multi-layer tie layer and a contact layer, wherein:
the contact layer consists of a cycloolefin copolymer (COC),
the multi-layer tie layer is positioned in between the base layer and the contact layer,
a loading of a first layer of the multi-layer tie layer is in the range of 7 to 20 g/m$^2$,
a loading of a second layer of the multi-layer tie layer is in the range of 7 to 20 g/m$^2$, and
a ratio between the loading of the first layer of the multi-layer tie layer and the loading of the second layer of the multi-layer tie layer is less than or equal to 2,
wherein the film consists of the base layer and the coextrusion layer, and
wherein the film is resistant to nicotine, fentanyl, rivastigmine, or lidocaine.

11. The film according to claim 10, wherein a loading of the contact layer is in the range of 4 to 20 g/m$^2$.

12. The film according to claim 10, wherein a loading of an entirety of the multi-layer tie layer is in the range of 14 to 40 g/m$^2$.

13. The film according to claim 10, wherein a loading of at least a portion of the multi-layer tie layer is in the range of 14 to 40 g/m$^2$.

14. The film according to claim 6, wherein:
the loading of the first layer of the multi-layer tie layer is in the range of around 11 to around 14 g/m$^2$, and
the loading of the second layer of the multi-layer tie layer is in the range of around 11 to around 14 g/m$^2$.

15. The film according to claim 14, wherein a loading of the contact layer is in the range of around 15 to around 20 g/m$^2$.

16. The laminate according to claim 7, wherein:
the first layer of the multi-layer tie layer comprises acrylic acid and the second layer of the multi-layer tie layer comprises polyethylene,
the loading of the first layer of the multi-layer tie layer is in the range of around 11 to around 14 g/m$^2$, and
the loading of the second layer of the multi-layer tie layer is in the range of around 11 to around 14 g/m$^2$.

17. The laminate according to claim 16, wherein a loading of the contact layer is in the range of around 15 to around 20 g/m$^2$.

18. The film according to claim 10, wherein:
the loading of the first layer of the multi-layer tie layer is in the range of around 10 to 20 g/m$^2$, and
the loading of the second layer of the multi-layer tie layer is in the range of around 10 to 20 g/m$^2$.

19. The film according to claim 10, wherein:
the loading of the first layer of the multi-layer tie layer is in the range of around 10 to around 14 g/m$^2$, and
the loading of the second layer of the multi-layer tie layer is in the range of around 10 to around 14 g/m$^2$.

20. The film according to claim 10, wherein:
the first layer of the multi-layer tie layer comprises acrylic acid and the second layer of the multi-layer tie layer comprises polyethylene,
the loading of the first layer of the multi-layer tie layer is in the range of around 11 to around 14 g/m$^2$, and
the loading of the second layer of the multi-layer tie layer is in the range of around 11 to around 14 g/m$^2$.

21. The film according to claim 20, wherein a loading of the contact layer is in the range of around 15 to around 20 g/m$^2$.

22. The film according to claim 1, wherein a ratio between the loading of the first layer of the multi-layer tie layer and the loading of the contact layer is less than or equal to 2.

23. The film according to claim 22, wherein a ratio between the loading of the second layer of the multi-layer tie layer and the loading of the contact layer is less than or equal to 2.

24. The laminate according to claim 7, wherein a ratio between the loading of the first layer of the multi-layer tie layer and the loading of the contact layer is less than or equal to 2.

25. The laminate according to claim 24, wherein a ratio between the loading of the second layer of the multi-layer tie layer and the loading of the contact layer is less than or equal to 2.

26. The film according to claim 10, wherein a ratio between the loading of the first layer of the multi-layer tie layer and the loading of the contact layer is less than or equal to 2.

27. The film according to claim 26, wherein a ratio between the loading of the second layer of the multi-layer tie layer and the loading of the contact layer is less than or equal to 2.

* * * * *